(12) United States Patent
Girard et al.

(10) Patent No.: US 11,731,778 B1
(45) Date of Patent: Aug. 22, 2023

(54) APPARATUS FOR REMOVING PARTICULATE MATTER FROM BLEED GAS

(71) Applicant: Pratt & Whitney Canada Corp., Longueuil (CA)

(72) Inventors: Julien Girard, Sainte-Julie (CA); Sylvain Lamarre, Boucherville (CA); Xiaoliu Liu, Mississauga (CA); David Koo, Toronto (CA); Kevin Nguyen, Montreal (CA); Liam McPherson, Ottawa (CA); AnnMarie Unnippillil, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/744,199

(22) Filed: May 13, 2022

(51) Int. Cl.
*F02C 9/18* (2006.01)
*B64D 33/02* (2006.01)
*F02C 7/052* (2006.01)

(52) U.S. Cl.
CPC .............. *B64D 33/02* (2013.01); *F02C 7/052* (2013.01); *B64D 2033/022* (2013.01); *B64D 2033/0246* (2013.01); *F05D 2220/323* (2013.01); *F05D 2260/607* (2013.01)

(58) Field of Classification Search
CPC .............. B64D 33/02; B64D 2033/022; B64D 2033/0246; F02C 7/052; F02C 9/18; F02C 9/52; F05D 2220/323; F05D 2260/607
See application file for complete search history.

(56) References Cited

U.S. PATENT DOCUMENTS

| 4,463,552 | A | 8/1984 | Monhardt | |
|---|---|---|---|---|
| 5,123,240 | A | 6/1992 | Frost | |
| 6,701,715 | B2 | 3/2004 | Anderson | |
| 7,931,740 | B2 | 4/2011 | Al-Alusi | |
| 10,287,992 | B2 | 5/2019 | Tan | |
| 10,512,876 | B2 | 12/2019 | Mercier | |
| 2009/0139191 | A1* | 6/2009 | Roundy | F02C 7/052 55/392 |
| 2010/0313573 | A1* | 12/2010 | Walters | F16K 11/0525 60/785 |
| 2020/0103046 | A1* | 4/2020 | Romano | F16K 31/126 |

\* cited by examiner

*Primary Examiner* — Steven M Sutherland
(74) *Attorney, Agent, or Firm* — Getz Balich LLC

(57) ABSTRACT

A gas turbine engine includes an intake device. The intake device includes a snorkel and a filter case. The snorkel includes a tubular body and an inlet aperture. The tubular body extends between a closed end and an open end opposite the closed end. The inlet aperture is formed through the tubular body proximate the closed end. The tubular body forms a first portion of a gas flow path for a bleed gas from the inlet aperture to the open end. The filter case is connected to the tubular body. The filter case extends between a first end and a second end. The filter case includes a sidewall extending from the first end to the second end. The sidewall surrounds a filter cavity. The filter case is configured to receive the bleed gas from the open end of the tubular body. The filter case and the snorkel form a unitary component.

20 Claims, 8 Drawing Sheets

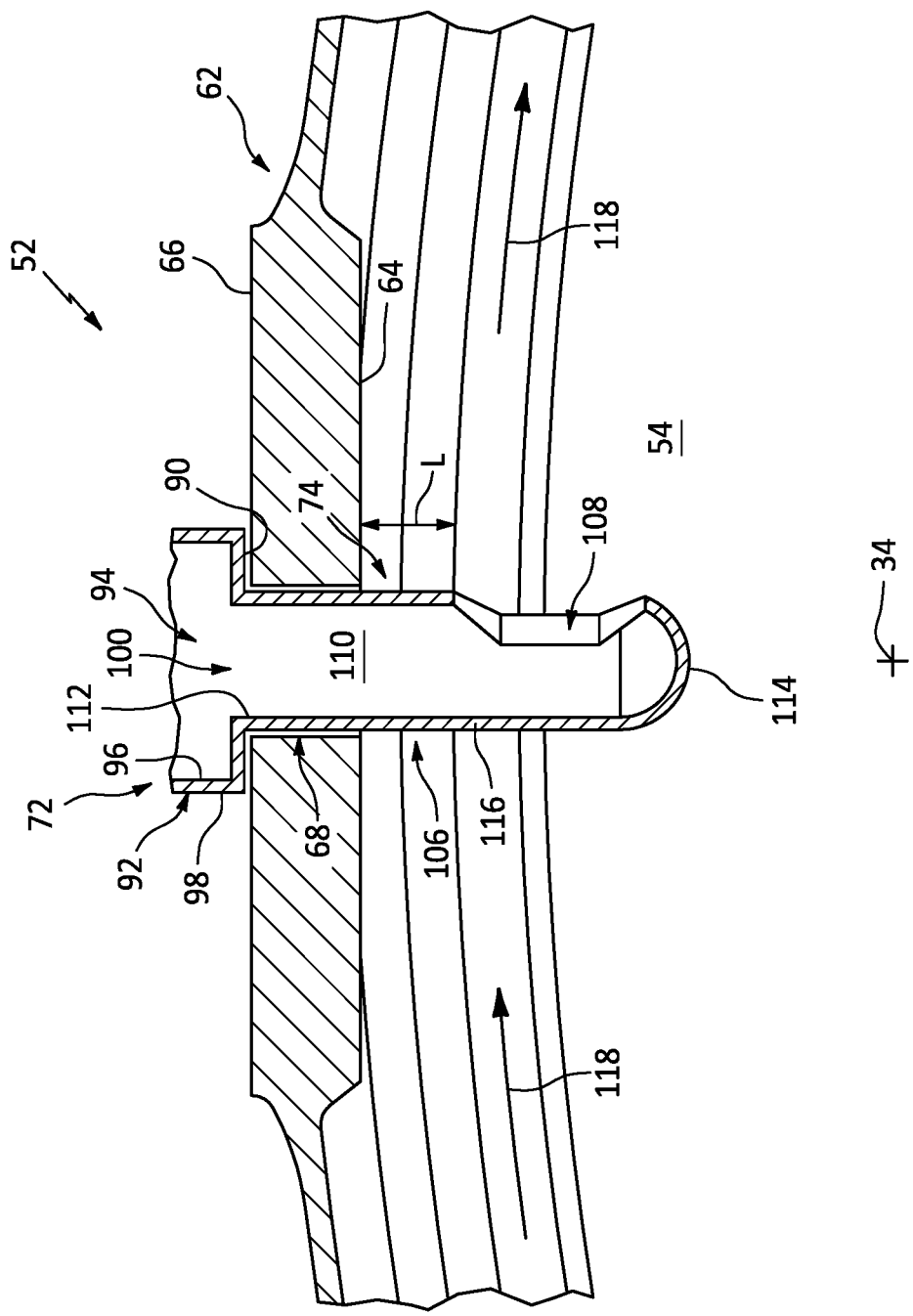

APPARATUS FOR REMOVING PARTICULATE MATTER FROM BLEED GAS

TECHNICAL FIELD

This disclosure relates generally to bleed gas systems for gas turbine engines and, more particularly, to systems and methods for removing particulate matter from bleed gas.

BACKGROUND OF THE ART

Gas turbine engines, such as those used for aircraft propulsion, may use pressurized bleed gas (e.g., bleed air from a compressor) for operation of one or more systems of the gas turbine engine. Depending on the source of the bleed gas, some amount of contaminants may be present and may be entrained with or otherwise carried by the bleed gas. Some pneumatic system components which use the bleed gas may be particularly sensitive to the presence of contaminants, such as particulate matter, within the bleed gas. Various systems and methods are known in the art for reducing the impact of particulate matter on pneumatic system components. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a gas turbine engine includes a compressor section, a cavity, an engine case, and an intake device. The compressor section is disposed about an axial centerline of the gas turbine engine. The compressor section defines a portion of a core flow path through the gas turbine engine. The cavity is disposed downstream of the compressor section with respect to the core flow path. The engine case is disposed about the axial centerline. The engine case includes an interior side and an exterior side. The interior side surrounds the cavity. The engine case includes a snorkel aperture which extends through the engine case from the exterior side to the interior side. The intake device is positioned within the snorkel aperture. The intake device includes a snorkel and a filter case. The snorkel includes a tubular body and an inlet aperture. The tubular body extends between a closed end and an open end opposite the closed end. The inlet aperture is formed through the tubular body adjacent the closed end. The tubular body forms a first portion of a gas flow path for a bleed gas from the inlet aperture to the open end. The tubular body extends through the snorkel aperture with the inlet aperture positioned within the cavity. The filter case is connected to the tubular body. The filter case extends between a first end and a second end. The filter case includes a sidewall extending from the first end to the second end. The sidewall surrounds a filter cavity. The filter case includes a first aperture and at least one second aperture. The first aperture extends from the filter cavity through the second end. The at least one second aperture extends through the sidewall. The filter case is configured to receive the bleed gas from the open end of the tubular body. The filter case and the snorkel form a unitary component.

In any of the aspects or embodiments described above and herein, the intake device may further include a housing. The housing may be mounted to the engine case at the snorkel aperture. The housing may include a filter chamber and an outlet. The outlet may extend through the housing from the filter chamber to an exterior of the housing. The filter case may be positioned within the chamber.

In any of the aspects or embodiments described above and herein, the intake device may further include a cap. The cap may be positioned adjacent the first end. The cap may be configured to sealingly engage the housing.

In any of the aspects or embodiments described above and herein, the cap may form the unitary component with the filter case and the snorkel.

In any of the aspects or embodiments described above and herein, the cap may include a first cap end, a second cap end, and a vent aperture. The second cap end may be positioned adjacent the first end. The vent aperture may extend through the cap from the first cap end to the second cap end.

In any of the aspects or embodiments described above and herein, the intake device may further include a vent valve fluidly coupled with the vent aperture.

In any of the aspects or embodiments described above and herein, the intake device may form a second portion of the gas flow path downstream of the first portion of the gas flow path. The intake device may be configured so that the bleed gas flows along the second portion of the gas flow path from the snorkel into the filter cavity, from the filter cavity into a gas passage between the filter case and the housing, and from the gas passage through the outlet.

In any of the aspects or embodiments described above and herein, the intake device may form a second portion of the gas flow path downstream of the first portion of the gas flow path. The intake device may be configured so that the bleed gas flows along the second portion of the gas flow path from the snorkel into a gas passage between the filter case and the housing, from the gas passage into the filter cavity, and from the filter cavity through the outlet.

In any of the aspects or embodiments described above and herein, the gas turbine engine may further include a bleed-off valve in fluid communication with the intake device. The bleed-off valve may be configured to receive the bleed gas from the intake device.

In any of the aspects or embodiments described above and herein, the bleed-off valve may be in fluid communication with the core flow path within the compressor section via a pressure relief line.

In any of the aspects or embodiments described above and herein, the inlet aperture may face a circumferential direction relative to the axial centerline.

In any of the aspects or embodiments described above and herein, the compressor section may be configured to impart a swirl component on pressurized gas flowing within the cavity. The swirl component may have a swirl direction about the axial centerline of the gas turbine engine. The inlet aperture may be located facing away from the swirl direction.

According to another aspect of the present disclosure, an intake device for a gas turbine engine includes a filter case, a snorkel, and a cap. The filter case extends between a first end and a second end. The filter case includes a sidewall extending from the first end to the second end. The sidewall surrounds a filter cavity between the first end and the second end. The filter case includes a first aperture and at least one second aperture. The first aperture extends from the filter cavity through the second end. The at least one second aperture extends through the sidewall. The snorkel includes a tubular body and an inlet aperture. The tubular body extends between a closed end and an open end opposite the closed end. The inlet aperture is formed through the tubular body proximate the closed end. The tubular body is connected to the second end with the open end fluidly coupled with the first aperture. The cap is connected to the second end. The cap includes a first cap end, a second cap end, and a vent aperture. The second cap end is positioned adjacent the first end. The vent aperture extends through the cap from the first cap end to the second cap end.

In any of the aspects or embodiments described above and herein, the filter case, the snorkel, and the cap may form a unitary component.

In any of the aspects or embodiments described above and herein, the intake device may include a filter positioned within the filter cavity.

In any of the aspects or embodiments described above and herein, the filter may include a tubular filter body. The tubular filter body may include a first filter end, a second filter end, an outer filter surface, an inner filter surface, and a central gas passage. The outer filter surface and the inner filter surface extend from the first filter end to the second filter end. The inner filter surface surrounds the central gas passage. The vent aperture is in fluid communication with the central gas passage.

In any of the aspects or embodiments described above and herein, the inlet aperture may intersect the closed end.

In any of the aspects or embodiments described above and herein, the inlet aperture may be spaced from the closed end.

According to another aspect of the present disclosure, a gas turbine engine includes an engine case and an intake device mounted to the engine case. The engine case is disposed about an axial centerline of the gas turbine engine. The engine case includes an interior side and an exterior side. The interior side surrounds an annular cavity. The engine case includes a snorkel aperture which extends through the engine case from the exterior side to the interior side. The intake device includes a housing, a snorkel, filter case, and a cap. The housing is mounted to the engine case at the snorkel aperture. The housing includes a filter chamber and an outlet. The outlet extends through the housing from the filter chamber to an exterior of the housing. The snorkel includes a tubular body and an inlet aperture. The tubular body extends between a closed end and an open end opposite the closed end. The inlet aperture is formed through the tubular body adjacent the closed end. The inlet aperture is positioned within the annular cavity. The filter case extends between a first end and a second end. The second end is mounted to the open end. The filter case includes a sidewall extending from the first end to the second end. The sidewall surrounds a filter cavity. The filter case includes a first aperture and at least one second aperture. The first aperture extends from the filter cavity through the second end. The at least one second aperture extends through the sidewall. The cap is positioned adjacent the first end. The cap is configured to sealingly engage the housing. At least the cap and the filter case form a first unitary component.

In any of the aspects or embodiments described above and herein, the housing and the snorkel form a second unitary component.

The present disclosure, and all its aspects, embodiments and advantages associated therewith will become more readily apparent in view of the detailed description provided below, including the accompanying drawings.

DESCRIPTION OF THE DRAWINGS

FIG. 3 illustrates a front, cutaway view of a portion of an intake device, in accordance with one or more embodiments of the present disclosure.

DETAILED DESCRIPTION

Figure 1:
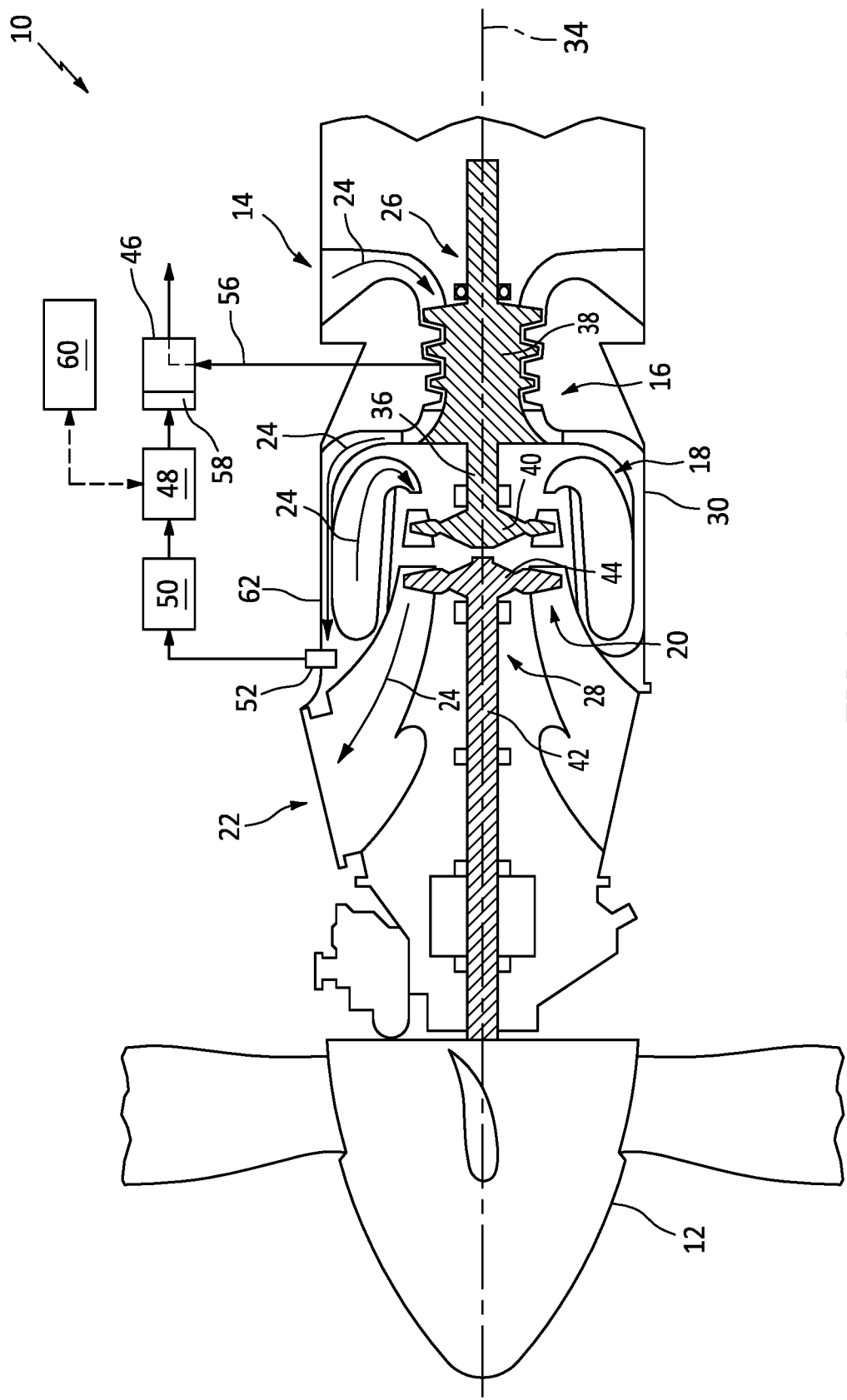
FIG. 1 illustrates a schematic view of a gas turbine engine, in accordance with one or more embodiments of the present disclosure.

FIG. 1 schematically illustrates a gas turbine engine 10. The gas turbine engine 10 of FIG. 1 is a multi-spool turboprop engine. However, while the following description and accompanying drawings refer to a turboprop engine as an example, it should be understood that aspects of the present disclosure may be equally applicable to other types of gas turbine engines including, but not limited to, a turboshaft gas turbine engine, a turbofan gas turbine engine, or a turbojet gas turbine engine. The gas turbine engine 10 of FIG. 1 is configured to drive (e.g., apply a rotational force to) a propeller 12. This gas turbine engine 10 includes an air inlet 14, a compressor section 16, a combustor section 18, a turbine section 20, and an exhaust outlet 22. The compressor section 16 drives air from the air inlet 14 along a core flow path 24 for compression and communication into the combustor section 18 and then expansion through the turbine section 20.

The gas turbine engine 10 of FIG. 1 includes a first rotational assembly 26 (e.g., a high-pressure spool), a second rotational assembly 28 (e.g., a low-pressure spool), an engine static structure 30 (e.g., an engine case), and an annular combustor 32. The first rotational assembly 26 and the second rotational assembly 28 are mounted for rotation about an axial centerline 34 (e.g., a rotational axis) of the gas turbine engine 10 relative to the engine static structure 30. The first rotational assembly 26 includes a first shaft 36, a first compressor 38, and a first turbine 40. The first shaft 36 interconnects the first compressor 38 and the first turbine 40. The second rotational assembly 28 includes a second shaft 42 and a second turbine 44. The second turbine 44 is connected to the second shaft 42. It should be understood that "low pressure" and "high pressure" or variations thereof as used herein are relative terms indicating that the high pressure is greater than the low pressure. The annular combustor 32 is disposed between the first compressor 38 and the first turbine 40 along the core flow path 24. In operation, airflow along the core flow path 24 is compressed by the first compressor 38, mixed and burned with fuel in the combustor 32, and then expanded through the first turbine 40 and the second turbine 44. The first turbine 40 and the second turbine 44 rotationally drive the first rotational assembly 26 and the second rotational assembly 28, respectively, in response to the expansion of the combustion gases. The combustion gases may then exit the gas turbine engine 10 via the exhaust outlet 22.

The first rotational assembly 26 and the second rotational assembly 28 of FIG. 1 are mechanically independent of one another so that they may rotate at different speeds and/or in opposite directions. The air flow through the gas turbine engine 10 of FIG. 1 along the core flow path 24 is directed in an aft-to-forward direction, where the air inlet 14 may be disposed in a portion of the gas turbine engine 10 which is aft of the combustor 32 and the exhaust outlet 22 may be disposed in a portion of the gas turbine engine 10 which is forward of combustor 32.

The gas turbine engine 10 of FIG. 1 includes a bleed-off valve 46 (BOV), a pilot valve 48, an orifice pack 50, and an intake device 52. As will be discussed in further detail, the intake device 52 is in fluid communication with a pressurized gas cavity 54 of the gas turbine engine 10. The intake device 52 may be fluidly coupled to the orifice pack 50. The orifice pack 50 may be fluidly coupled to the pilot valve 48. The pilot valve 48 may be fluidly coupled to the bleed-off valve 46 (e.g., a pneumatic actuator of the bleed-off valve 46). In other words, the intake device 52 may be connected to the orifice pack 50, the orifice pack 50 may be connected to the pilot valve 48, and the pilot valve 48 may be connected to the bleed-off valve 46 using one or more conduits, pipes, tubes, cases, apertures, and the like, so that a fluid (e.g., a pressurized gas) is conveyed from a first component (e.g., the intake device 52) to a second component (e.g., the orifice pack 50).

The bleed-off valve 46 is in fluid communication with the core flow path 24 within the compressor section 16. For example, the bleed-off valve 46 of FIG. 1 is fluidly coupled with an intermediate stage of the first compressor 38 by a pressure relief line 56. The bleed-off valve 46 is configured to control (e.g., regulate) core gas flow along the core flow path 24 by selectively releasing core gas from the core flow path 24 to the surrounding atmosphere, based on operating conditions of the gas turbine engine 10. In other words, core gas from an intermediate stage of the first compressor 38 may flow through the pressure relief line 56 and may be released to the surrounding atmosphere by the bleed-off valve 46.

The bleed-off valve 46 may include or otherwise be in operable communication with a pneumatic actuator 58. The pneumatic actuator 58 may be operated by pressurized gas to selectively position the bleed-off valve 46 in a closed position, an open position, and a plurality of intermediate positions between the closed position and the open position, to control the release of the core gas from the core flow path 24. The bleed-off valve 46 may be opened at a relatively low rotational speed of the first rotational assembly 26 (e.g., a relatively low engine power condition) and may be closed at a relatively high rotational speed of the first rotational assembly 26 (e.g., a relatively high engine power condition).

The bleed-off valve 46 may be a piloted valve. The gas turbine engine 10 of FIG. 1, for example, includes the pilot valve 48 fluidly coupled to the pneumatic actuator 58. The pilot valve 48 is configured to control a flow of pressurized gas (e.g., bleed air or bleed gas) to the pneumatic actuator 58 to control the position of the bleed-off valve 46. The pilot valve 48 may be configured as, for example, a solenoid valve. The pilot valve 48 may be controlled using an electrical signal provided by a controller 60. The controller 60 may be configured to determine whether operating conditions of the gas turbine engine 10 satisfy criteria for releasing core gases from the core flow path 24 via the bleed-off valve 46, for example, based on signals from one or more sensors (e.g., pressure sensors, temperature sensors, etc.) disposed within the compressor section 16.

The controller 60 may include any type of computing device, computational circuit, processor(s), CPU, computer, or the like capable of executing a series of instructions that are stored in memory. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The controller 60 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and which may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) maybe directly or indirectly coupled to the controller 60. The controller 60 may include, or may be in communication with, an input device that enables a user to enter data and/or instructions, and may include, or be in communication with, an output device configured, for example to display information (e.g., a visual display or a printer), or to transfer data, etc. Communications between the controller 60 and the pilot valve 48, for example, may be via a hardwire connection or via a wireless connection. A person of skill in the art will recognize that portions of the controller 60 may assume various forms (e.g., digital signal processor, analog device, etc.) capable of performing the functions described herein.

Figure 2:
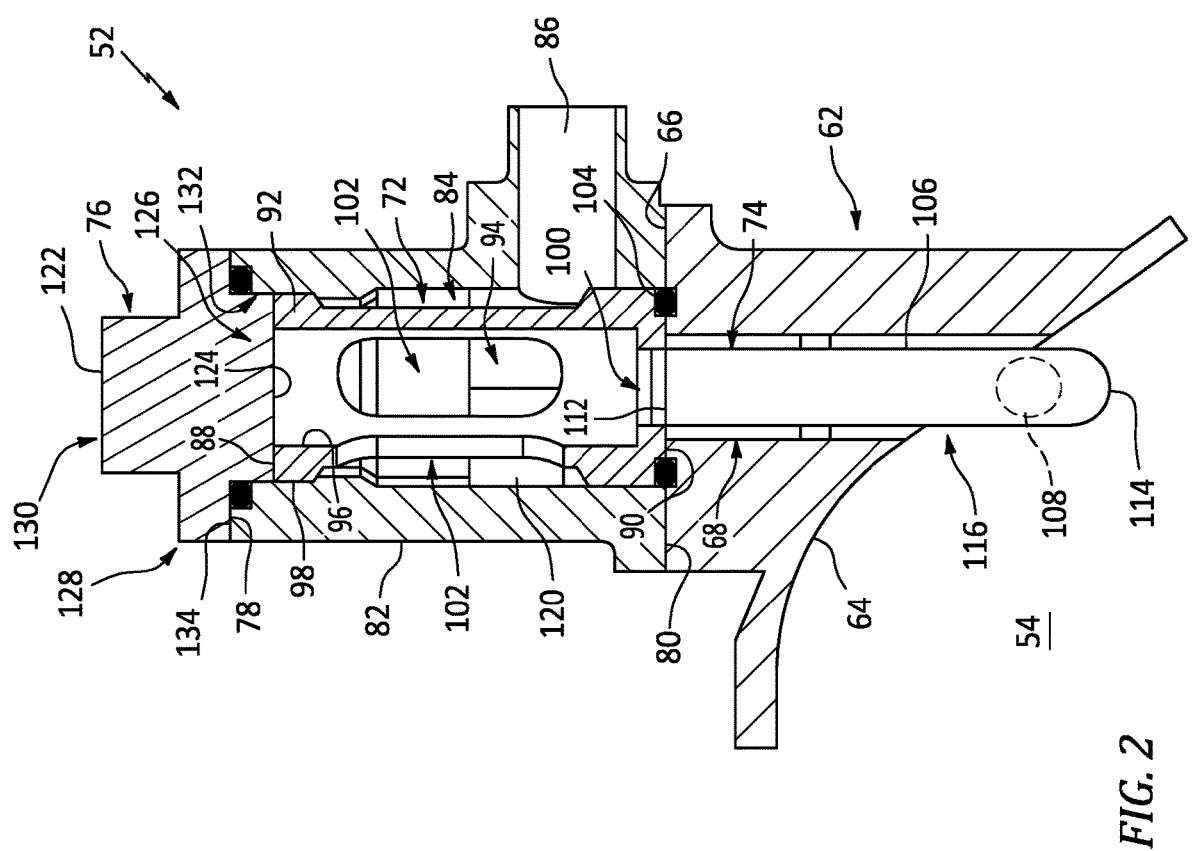
FIG. 2 illustrates a side, cutaway view of an intake device, in accordance with one or more embodiments of the present disclosure.

Referring to FIGS. 1-3, pressurized gas used for operation of the bleed-off valve 46 may be sourced from one or more locations within the gas turbine engine 10. The gas turbine engine 10 of FIG. 1, for example, includes a portion of the intake device 52 positioned within the cavity 54. The cavity 54 of FIG. 1 is formed, in part, by an engine case 62, which engine case 62 may form a portion of the engine static structure 30. The engine case 62 includes an interior side 64 and an exterior side 66 opposite the interior side 64. The interior side 64 surrounds the cavity 54. The engine case 62 further includes a snorkel aperture 68 extending through the engine case 62 from the interior side 64 to the exterior side 66. The intake device 52 is positioned within the snorkel aperture 68. The cavity 54 of FIG. 1 includes a portion of the core flow path 24 between the first compressor 38 and the combustor 32. However, the intake device 52 of the present disclosure is not limited to use with the particular cavity 54 of FIG. 1 or with the core flow path 24.

Pressurized gas received by the intake device 52 may be supplied to the pneumatic actuator 58 for operation of the bleed-off valve 46. The cavity 54 of FIG. 1 may be located downstream of a highest-pressure compressor stage of the compressor section 16 along the core flow path 24. The pressurized gas from the cavity 54 may provide relatively high-pressure gases suitable for effecting operation of the bleed-off valve 46. Pressurized gas received by the intake device 52 may be conveyed to the pneumatic actuator 58 through the orifice pack 50. The orifice pack 50 may control (e.g., regulate) a pressure of the pressurized gas supplied to the bleed-off valve 46 by the intake device 52.

Gas within annular gas turbine engine cavities located within or downstream of a compressor section, such as the cavity 54, may exhibit a high degree of swirl. The gas flowing downstream from the first compressor 38, for example, may have a relatively high circumferential flow component, which causes the gas to swirl circumferentially about the axial centerline 34 as the gas flows downstream towards the combustor 32. Significant swirl velocity may be imparted on the gas by upstream rotating components such as those of the compressor section 16. The relatively high velocity of the swirling gas may allow the gas to carry particulate matter such as dust, dirt, sand, debris, etc. For example, gas received by the intake device 52 for operation of the bleed-off valve 46 may include particulate matter entrained with the gas. The particulate matter may have a size within a range of approximately 50 to 200 microns; however, particulate matter size may vary. Particulate matter ingested by the intake device 52 with the pressurized gas may be conveyed to downstream components such as the orifice pack 50, the pilot valve 48, and the pneumatic actuator 58. In particular, the bleed-off valve 46 and/or the pneumatic actuator 58 for the bleed-off valve 46 may exhibit some sensitivity to particulate matter exposure. For example, excessive build-up of particulate matter within the pneumatic actuator 58 can lead to improper operation of the bleed-off valve 46.

Referring to FIGS. 1-8, the intake device 52 of the present disclosure may eliminate or substantially reduce the quantity of particulate matter to which downstream components, such as the bleed-off valve 46 and the pneumatic actuator 58, are exposed. While the intake device 52 is describe herein with respect to the operation of the bleed-off valve 46 of FIG. 1, it should be understood that aspects of the intake device 52 are also relevant to other bleed gas systems, which other bleed gas systems may include components which may be sensitive to particulate matter entrained with the bleed gas.

The intake device of FIG. 2 includes a housing 70, a filter case 72, a snorkel 74, and a cap 76. The housing 70 includes a first end 78, a second end 80, a tubular sidewall 82, a filter chamber 84, and an outlet 86. The tubular sidewall 82 extends from the first end 78 to the second end 80. The second end 80 is mounted to the engine case 62 at (e.g., on, adjacent, or proximate) the exterior side 66 proximate the snorkel aperture 68. The tubular sidewall 82 surrounds the snorkel aperture 68 along the exterior side 66. The housing 70 may be welded to the engine case 62 or alternatively attached to the engine case 62, for example, using one or more fasteners (not shown). The housing 70 may alternatively be formed as a portion (e.g., an integral portion) of the engine case 62. The filter chamber 84 extends within the tubular sidewall 82 from the first end 78 to the second end 80. The filter chamber 84 is positioned coincident with the snorkel aperture 68. The outlet 86 extends through the tubular sidewall 82 from the filter chamber 84 to an exterior of the housing 70. The outlet 86 may be fluidly coupled to the orifice pack 50 (see FIG. 1).

The filter case 72 of FIG. 2 includes a first end 88, a second end 90, a tubular sidewall 92, and a filter cavity 94. The tubular sidewall 92 extends from the first end 88 to the second end 90. The tubular sidewall includes an interior side 96 and an exterior side 98 opposite the interior side 96. The interior side 96 surrounds the filter cavity 94. The filter case 72 may be open at the first end 88; e.g., the filter case 72 may include an opening to the filter cavity 94 at the first end 88. The filter case 72 further includes a first aperture 100 and at least one second aperture 102. The first aperture 100 is formed through the second end 90 of the filter case 72 coincident with the filter cavity 94. The at least one second aperture 102 is formed through the tubular sidewall 92 from the interior side 96 to the exterior side 98. The at least one second aperture 102 of FIG. 2 includes a plurality of second apertures 102 circumferentially spaced about the tubular sidewall 92. The filter case 72 is configured to be installed (e.g., selectively positioned) within the housing 70; e.g., within the filter chamber 84. FIG. 2 illustrates the filter case 72 installed in the housing 70. The second end 90 of the filter case 72 of FIG. 2 is positioned in contact with, proximate, and/or adjacent the exterior side 66. The intake device 52 of FIG. 2 includes a seal ring 104 positioned between the exterior side 66 and the second end 90 to provide a fluid seal between the engine case 62 and the filter case 72. With the filter case 72 installed in the housing 70, the tubular sidewall 92 may be spaced from the tubular sidewall 82 to form a gas passage 120. The gas passage 120 may be an annular gas passage which surrounds the tubular sidewall 92. The gas passage 120 is in fluid communication with the filter cavity 94 through the at least one second aperture 102. As will be discussed in further detail, the filter case 72 is configured to securely retain a filter within the filter cavity 94.

Figure 4B:
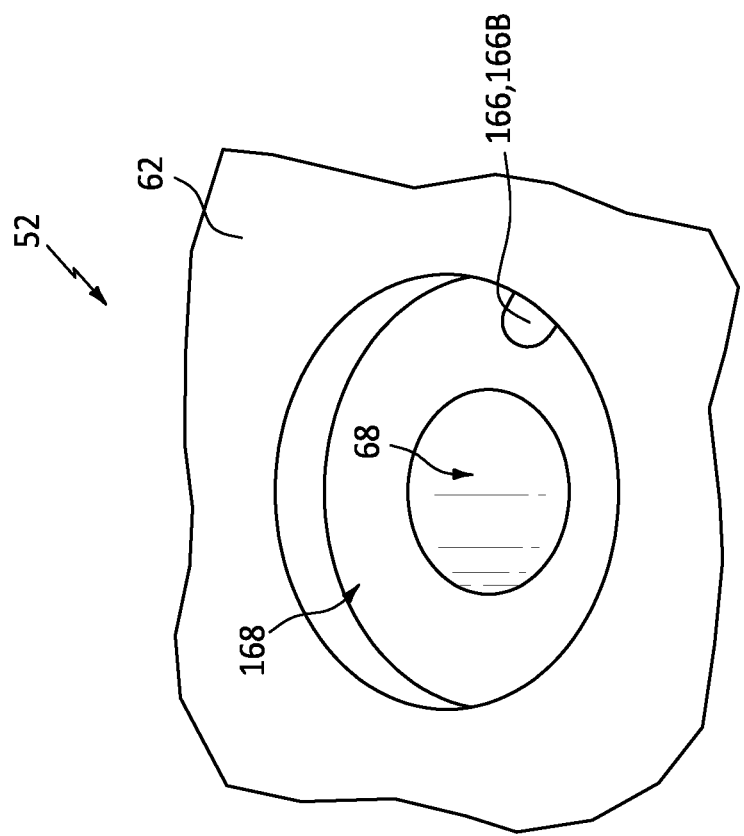
FIGS. 4A-B illustrate perspective views of portions of an intake device, in accordance with one or more embodiments of the present disclosure.
Figure 4A:
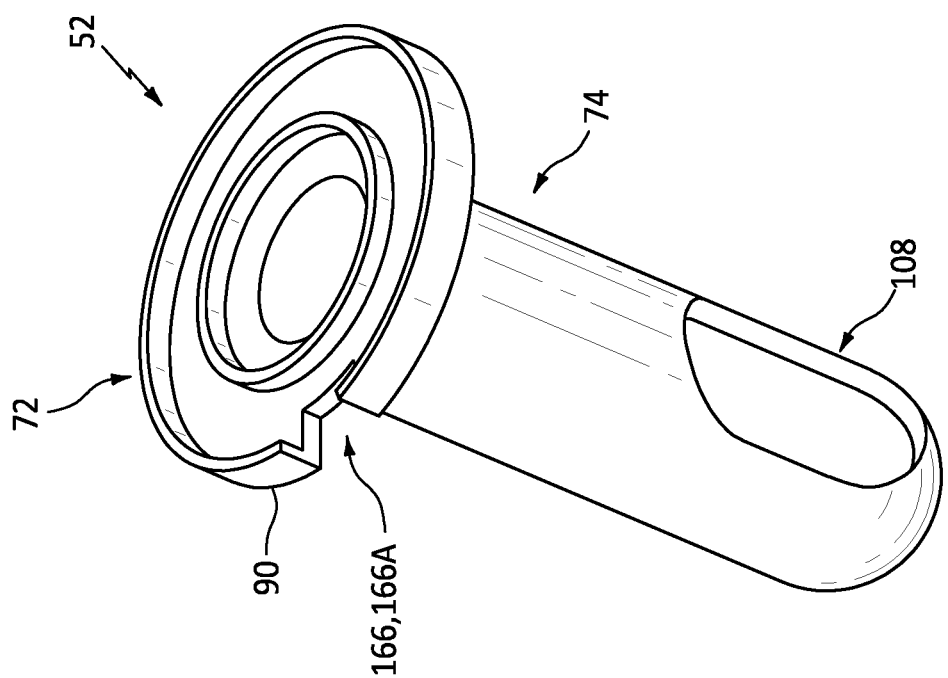

In some embodiments, the intake device 52 may include a mistake-proofing feature 166 configured to ensure that the intake device 52 is installed with the correct predetermined position and orientation of the inlet aperture 108 of the snorkel 74. FIG. 4A illustrates a perspective view of the snorkel 74 and a portion of the filter case 72. The second end 90 of the filter case 72 includes a first portion 166A of the mistake-proofing feature 166. For example, the first portion 166A of FIG. 4A includes an indentation formed in a circumferential perimeter of the filter case 72 at the second end 90. FIG. 4B illustrates a perspective view of a portion of the engine case 62. The engine case 62 of FIG. 4B includes a recess 168 surrounding the snorkel aperture 68. The filter case 72 may be positioned within the recess 168 such that the tubular body 106 extends through the snorkel aperture 68 of the engine case 62. The engine case 62 may further include a second portion 166B of the mistake-proofing feature 166. The second portion 166B of FIG. 4B includes a protrusion (e.g., a pin) positioned within the recess 168. Positioning the filter case 72 in the recess 168 such that the first portion 166A engages the second portion 166B may facilitate installation of the snorkel 74 with the correct predetermined position and orientation relative to the engine case 62.

The snorkel 74 of FIGS. 2 and 3 includes tubular body 106, an inlet aperture 108, and a gas passage 110. The tubular body 106 extends from an open end 112 to a closed end 114. The tubular body 106 surrounds the gas passage 110. The gas passage 110 extends from the closed end 114 through the open end 112. The open end 112 is mounted to or otherwise positioned at, proximate, and/or adjacent the filter case 72 (e.g., the second end 90). The gas passage 110 is positioned coincident with the first aperture 100 such that the gas passage 110 is fluidly coupled with the filter cavity 94. The closed end 114 forms a distal end of the tubular body 106 with respect to the filter case 72. The closed end 114 may be imperforate. The inlet aperture 108 is formed through the tubular body 106 between the gas passage 110 and an exterior of the tubular body 106. The inlet aperture 108 may be positioned at, proximate, and/or adjacent the closed end 114 of the tubular body 106. In some embodiments, the tubular body 106 may include an imperforate portion 116 between the inlet aperture 108 and the open end 112. In other words, the tubular body 106 may not be perforated in the imperforate portion 116 extending from the inlet aperture 108 to the open end 112. The tubular body 106 may be imperforate with the exception of the inlet aperture 108 and the open end 112.

The snorkel 74 is configured to be installed (e.g., selectively positioned) within the snorkel aperture 68. FIG. 2 illustrates the snorkel 74 installed in the snorkel aperture 68. With the snorkel 74 of FIGS. 2 and 3 installed in the snorkel aperture 68, the tubular body 106 extends through the snorkel aperture 68. The inlet aperture 108 and at least a portion of the tubular body 106, including the closed end 114, are positioned within the cavity 54. The tubular body 106 extends inward (e.g., radially inward) from the engine case 62. The tubular body 106 of FIG. 3 has a length L between the engine case 62 and the inlet aperture 108. FIG. 3 illustrates an exemplary flow direction 118 representing a circumferential flow component of the swirling gas within the cavity 54. A greater concentration of particulate matter may be entrained with the gas flowing along the flow direction 118 in the immediate vicinity (e.g., at, proximate, and/or adjacent) of the engine case 62. The length L may correspond to a gas flow region having a higher concentration of particulate matter. The location of the inlet aperture 108, with respect to the engine case 62, may correspond to a gas flow region having a relatively lower concentration of particulate matter. The position of the inlet aperture 108, spaced (e.g., radially spaced) from the engine case 62, may reduce the amount of particulate matter carried by gas, which gas may subsequently be ingested by the intake device 52 through the inlet aperture 108.

The snorkel 74 may be installed with the inlet aperture 108 having a predetermined position and orientation relative to the flow direction 118 of gas within the cavity 54. The inlet aperture 108 of FIG. 3 is located in a portion of the tubular body 106 which faces away from the flow direction 118 of the gas within the cavity 54. An imperforate portion of the tubular body 106 opposite the inlet aperture 108 may shield the inlet aperture 108 from direct impingement of particulate matter entrained with the gas flowing in the flow direction 118, thereby further reducing the amount of particulate matter carried by gas, which gas may subsequently be ingested by the intake device 52 through the inlet aperture 108.

Figure 5B:
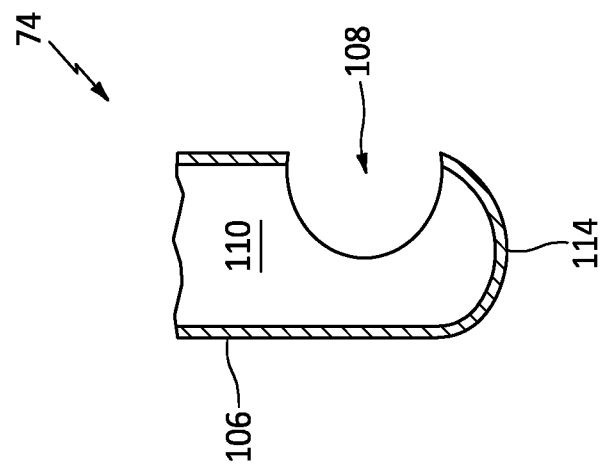
FIGS. 5A-B illustrate sectional views of portions of an intake device, in accordance with one or more embodiments of the present disclosure.
Figure 5A:
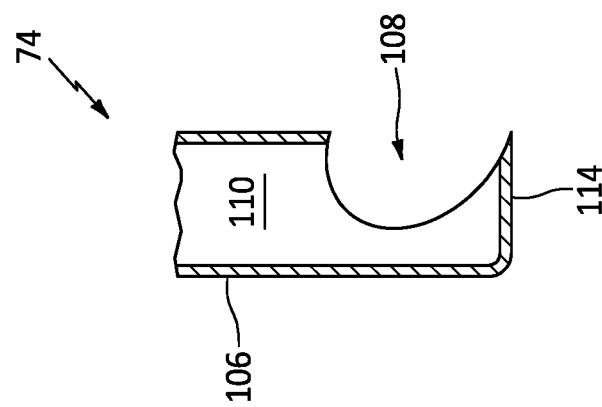

The tubular body 106 and inlet aperture 108 may be configured with a variety of orientations and shapes. FIGS. 5A and 5B illustrate sectional views of a portion of the tubular body 106 including the inlet aperture 108. The closed end 114 of FIG. 5A is substantially flat (e.g., planar). The inlet aperture 108 of FIG. 5A intersects or substantially intersects the closed end 114. The inlet aperture 108 of FIG. 5B is spaced (e.g., radially spaced) from the closed end 114. The closed end 114 of FIG. 5B has a rounded (e.g., hemispherical) shape. The closed end 114 may be rounded to provide a smooth aerodynamic profile. The snorkel 74 of the present disclosure, of course, is not limited to the foregoing exemplary tubular body 106 and/or inlet aperture 108 configurations of FIGS. 5A and 5B.

The cap 76 of FIG. 2 includes a first end 122, a second end 124, a mating portion 126, an enlarged portion 128, and a head portion 130. The cap 76 is configured to securely mate with the housing 70 at, proximate, and/or adjacent the first end 78 to securely retain the filter case 72 within the filter chamber 84 and to fluidly seal filter chamber 84 at the first end 78. The mating portion 126 includes the second end 124 and a perimeter wall 132. The perimeter wall 132 may extend substantially orthogonally relative to the second end 124. The mating portion 126 may have a cylindrical shape such that the perimeter wall 132 is a circumferential perimeter wall 132. The mating portion 126 is configured to fit within the filter chamber 84. The perimeter wall 132 may include threads configured to mate with corresponding threads of the tubular sidewall 82. The present disclosure, however, is not limited to the use of threads for securely mating the cap 76 with the housing 70. For example, in some other embodiments, the cap 76 may be mounted to the housing 70 using one or more fasteners (not shown) extending through the enlarged portion 128 and the tubular sidewall 82. The enlarged portion 128 is positioned adjacent the mating portion 126. The enlarged portion 128 of FIG. 2 is circumferentially enlarged relative to the mating portion 126. The enlarged portion 128 includes a mating surface 134 adjacent the perimeter wall 132. The mating surface 134 may be oriented substantially orthogonal relative to the perimeter wall 132. With the cap 76 installed (e.g., mated with) the housing 70, the mating surface 134 may engage the first end 78. The intake device 52 of FIG. 2 includes a seal ring 136 positioned between the first end 78 and the mating surface 134 to provide a fluid seal between the housing 70 and the cap 76. The head portion 130 includes the first end 122. The head portion 130 of FIG. 2 is positioned between the first end 122 and the enlarged portion 128. The head portion 130 may be configured with a hexagonal or other shape (see FIGS. 6 and 7) to allow the cap 76 to be installed or uninstalled (e.g., rotated) using a tool such as a wrench, socket, etc.

Figure 8:
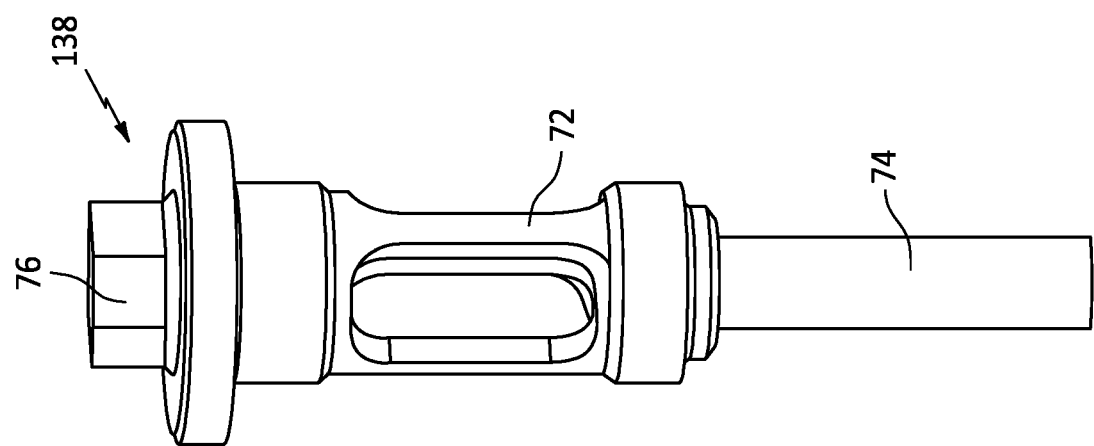
FIG. 8 illustrates a perspective view of a portion of an intake device, in accordance with one or more embodiments of the present disclosure.
Figure 7:
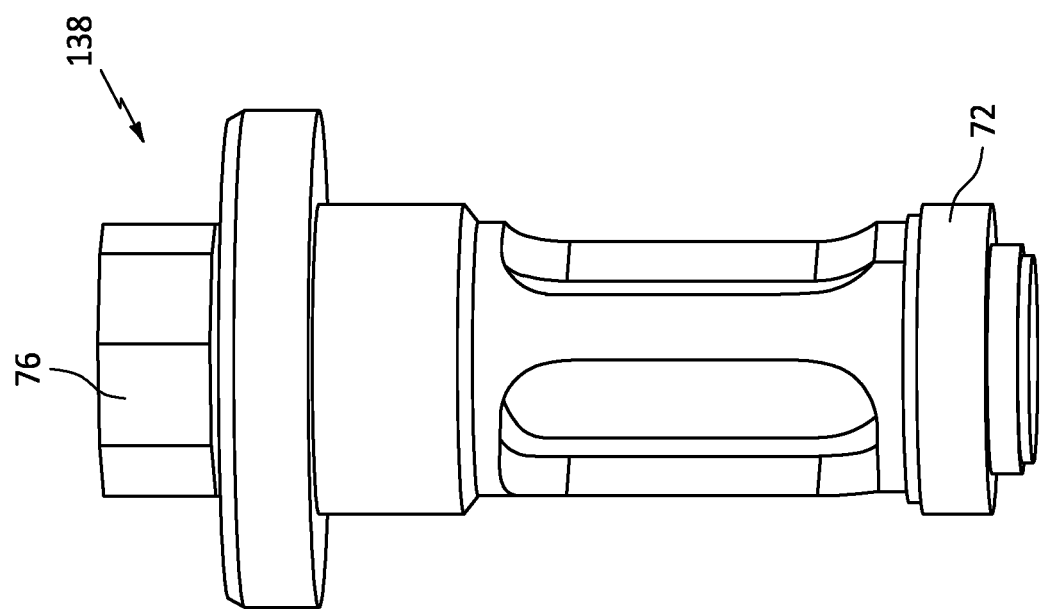
FIG. 7 illustrates a perspective view of a portion of an intake device, in accordance with one or more embodiments of the present disclosure.
Figure 6:
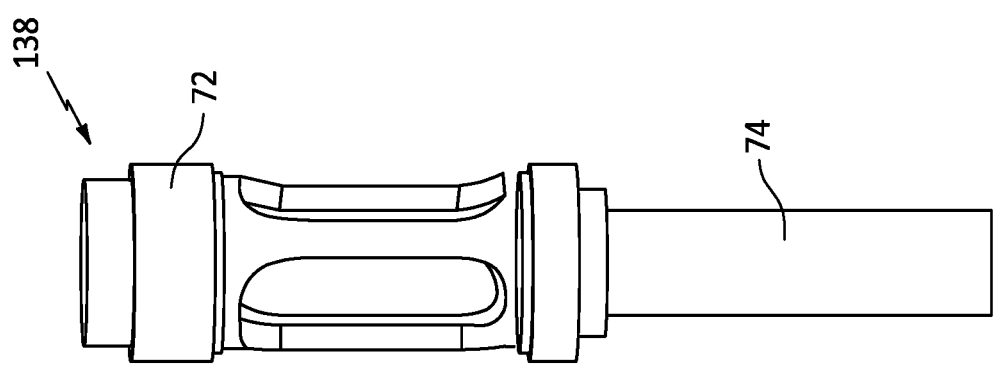
FIG. 6 illustrates a perspective view of a portion of an intake device, in accordance with one or more embodiments of the present disclosure.

The filter case 72, the snorkel 74, and/or the cap 76 may form a unitary component 138 of the intake device 52. The term "unitary component" as used herein means a single component, wherein combinations of the filter case 72, the snorkel 74, and/or the cap 76 (e.g., "elements" of the unitary component 138) are an inseparable body; e.g., formed of a single material, or a weldment of independent elements, etc. Not-limiting examples of the unitary component 138 are illustrated in FIGS. 6-8. The unitary component 138 of FIG. 6 includes the filter case 72 and the snorkel 74. The unitary component 138 of FIG. 7 includes the filter case 72 and the cap 76. The unitary component 138 of FIG. 8 includes the filter case 72, the snorkel 74, and the cap 76. The unitary component 138 of FIG. 8 may be formed (e.g., welded) with the filter 140 retained within the filter cavity 94, such that the filter 140 cannot be readily removed from the unitary component 138. Accordingly, the unitary component 138 of FIG. 7 and the associated filter 140 may be installed, removed, and/or replaced as a single unit.

Embodiments of the unitary component 138 of the present disclosure facilitate an intake device 52 with improved sealing. Separately formed elements of an intake device (e.g., a filter case, a snorkel, and/or a cap) may require sealing joints at element intersections. The intake device 52 may be exposed to thermal energy from one or more portions of the gas turbine engine (e.g., the combustor 32) as well as from the pressurized gas flowing within the cavity 54 and through the intake device 52. Separately formed elements of an intake device may experience varying degrees of thermal expansion and contraction due to the thermal energy exposure and may, therefore, exhibit differential growth relative to other separately formed elements of the intake device. Differential growth between elements of an intake device can complicate and/or compromise sealing at these element intersections. The unitary component 138 of the present disclosure may reduce the number of fluid (e.g., pressurized gas) leakage paths between elements of the intake device 52. Moreover, the unitary component 138 may facilitate uniform growth of the elements of the intake device 52, further improving sealing (e.g., between the unitary component 138 and the housing 70 and/or the engine case 62. Embodiments of the unitary component 138 of the present disclosure may also simplify maintenance for the intake device 52 (e.g., filter replacement) by allowing an operator to install or uninstall the filter case 72, or the filter case 72 and the snorkel 74, with the cap 76. Embodiments of the unitary component 138 of the present disclosure may also provide an intake device 52 that decreases the potential for foreign object damage ("FOD"). Separately formed elements of an intake device may result in the intake device additionally including a plurality of additional different elements (e.g., fasteners, seals, anti-rotation keys, etc.). If such additional elements work free during operation of the gas turbine engine or during maintenance associated with the intake device, additional elements may travel within the gas turbine engine and can potentially cause damage.

Figure 9:
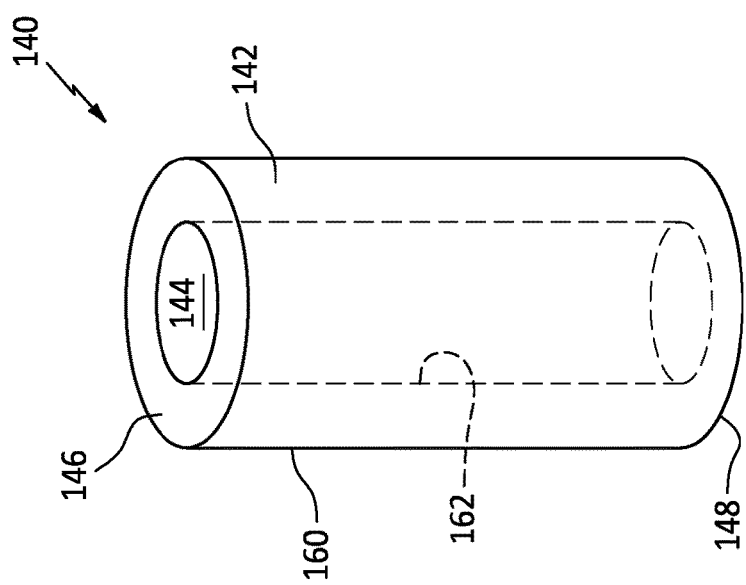
FIG. 9 illustrates a perspective view of an exemplary filter for an intake device, in accordance with one or more embodiments of the present disclosure.

Referring to FIG. 9, an exemplary filter 140 configured for use with the intake device 52 is illustrated. The filter 140 is configured to remove particulate matter which is entrained with pressurized gas passing through the intake device 52 (see, e.g., FIGS. 10 and 11). The filter 140 includes a tubular body 142 and a central gas passage 144. The tubular body 142 extends from a first end 146 to a second end 148. The tubular body 142 includes an outer surface 160 and an inner surface 162 opposite the outer surface 160. Each of the outer surface 160 and the inner surface 162 extend from the first end 146 to the second end 148. The inner surface 162 surrounds the central gas passage 144. The central gas passage 144 extends through the tubular body 142 from the first end 146 to the second end 148. A filter, such as the filter 140, may have limited contaminant accumulating capabilities and may require replacement after a predetermined period of operational time or particulate matter accumulation.

Figure 10:
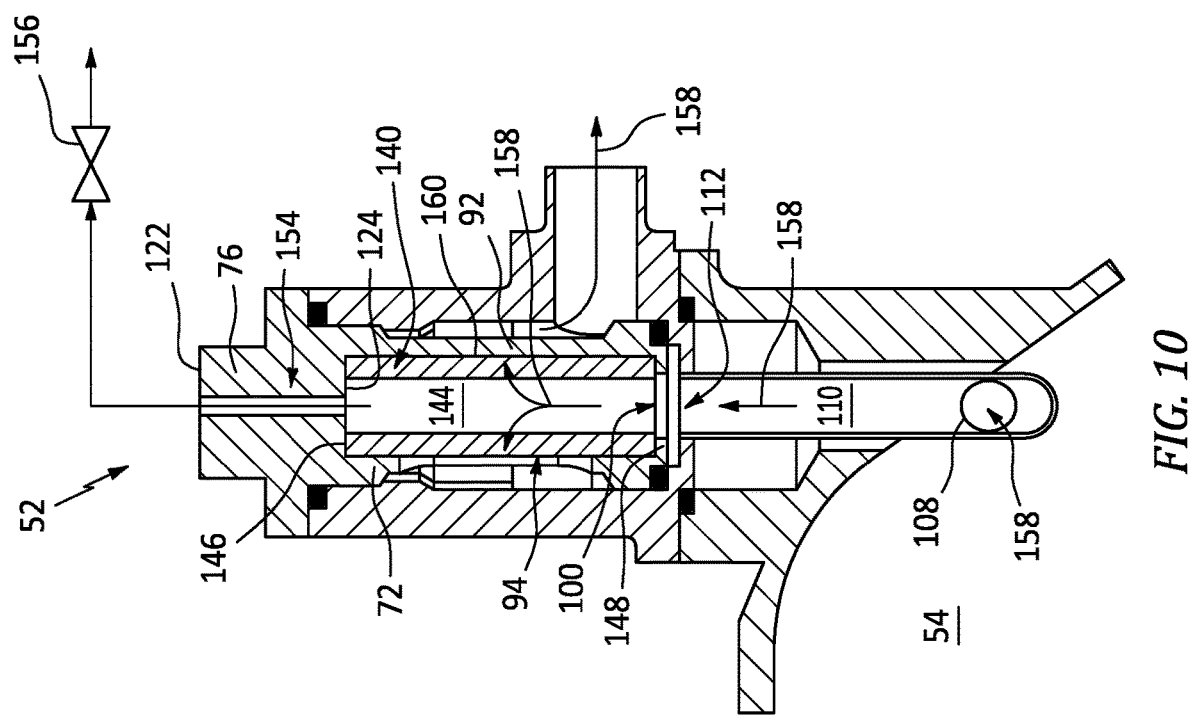
FIG. 10 illustrates a side, cutaway view of an intake device, in accordance with one or more embodiments of the present disclosure.
Figure 11:
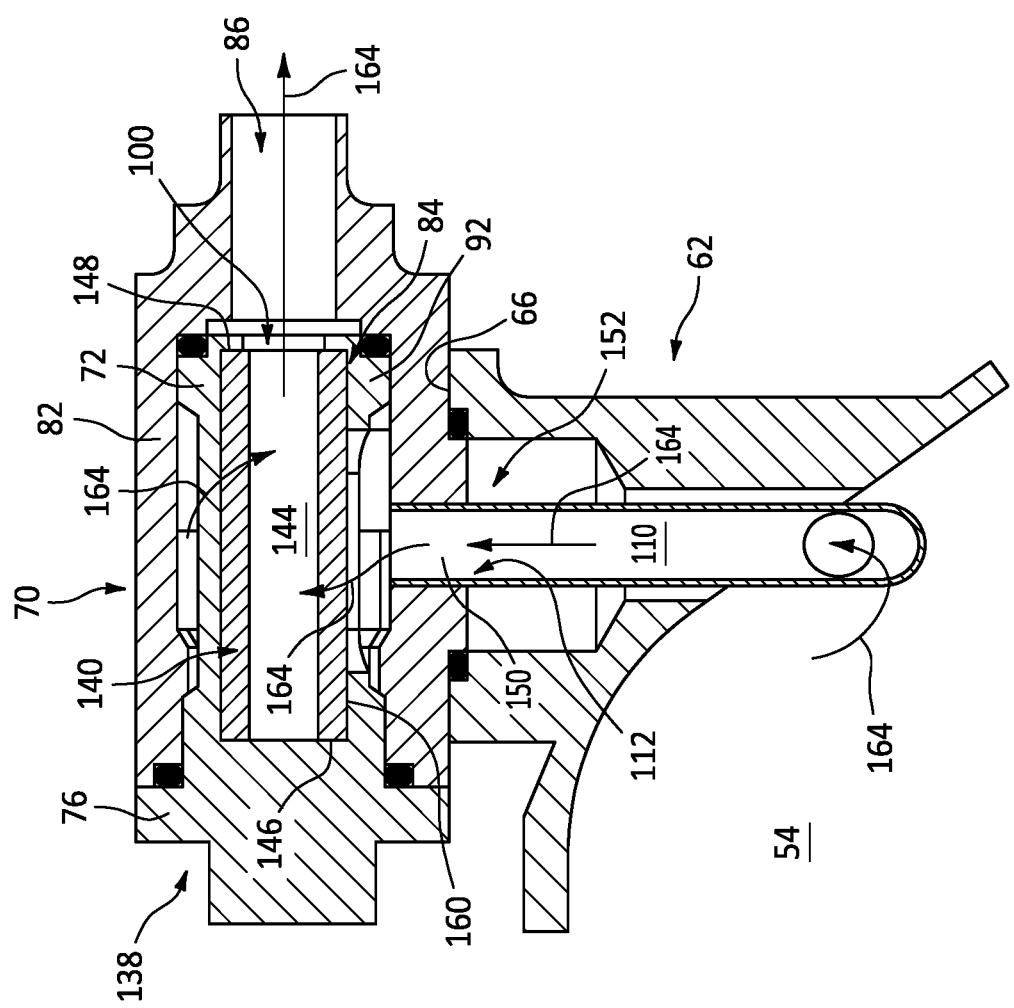
FIG. 11 illustrates a side, cutaway view of an intake device, in accordance with one or more embodiments of the present disclosure.

Referring to FIGS. 10 and 11, the filter 140 may be retained (e.g., securely positioned) within the filter cavity 94 by the filter case 72. In some embodiments, the filter 140 may have a vertical configuration. An exemplary vertical configuration is illustrated in FIG. 10. With the filter 140 installed in the filter case 72, the outer surface 160 may contact or otherwise be positioned proximate and/or adjacent the tubular sidewall 92 of the filter case. The first end 146 and/or the second end 148 may contact or otherwise be positioned proximate and/or adjacent the filter case 72. The central gas passage 144 of the filter 140 of FIG. 10 is substantially aligned with and/or coincident with the first aperture 100, which first aperture 100 is substantially aligned with and/or coincident with the gas passage 110 through the open end 112. The central gas passage 144 may thereby be fluidly coupled with the gas passage 110.

In some embodiments, the filter 140 may have a horizontal configuration. An exemplary horizontal configuration is illustrated in FIG. 11. With the filter 140 installed in the filter case 72, the outer surface 160 may contact or otherwise be positioned proximate and/or adjacent the tubular sidewall 92 of the filter case. The first end 146 and/or the second end 148 may contact or otherwise be positioned proximate and/or adjacent the filter case 72. The housing 70 of FIG. 11 is position relative to the engine case 62 so that the tubular sidewall 82 is mounted to the exterior side 66. The housing 70 includes an inlet 150 extending through the tubular sidewall 82. The inlet 150 is positioned coincident with the open end 112 such that the gas passage 110 is fluidly coupled with the filter chamber 84 by the inlet 150. The central gas passage 144 of the filter 140 of FIG. 11 is substantially aligned with and/or coincident with the first aperture 100, which first aperture 100 is substantially aligned with and/or coincident with the outlet 86. The central gas passage 144 may thereby be fluidly coupled with the outlet 86. The open end 112 may be mounted to the tubular sidewall 82 about the inlet 150. The filter case 72 and the cap 76 of FIG. 11 may form the unitary component 138. The housing 70 and the snorkel 74 of FIG. 11 may form a second unitary component 152 which is independent of (e.g., separable from) the unitary component 138. The configuration of the intake device 52 to allow a horizontal or a vertical configuration of the filter 140 may facilitate improved accessibility for the intake device 52 (e.g., during maintenance) and may accommodate limited available space (e.g., radial space) along the exterior of an engine case, such as the engine case 62.

In some embodiments, the cap 76 may include a vent aperture 154 and the intake device 52 may include a vent valve 156. The cap 76 of FIG. 10 includes the vent aperture 154 extending from the cap 76 from the first end 122 to the second end 124. The vent aperture 154 of FIG. 9 is in fluid communication with the central gas passage 144. FIG. 10 illustrates the vent aperture 154 fluidly coupled with the vent valve 156. The vent valve 156 is positionable in a closed position, an open position, and a plurality of intermediate positions between the closed position and the open position. The vent valve 156 may be manually positioned. In some embodiments, the vent valve 156 may be configured as a solenoid valve or other actuable valve (e.g., hydraulic, pneumatic, electro-mechanical, etc.) which can be positioned remotely. As will be discussed in further detail, the vent valve 156 may allow pressurized gas within the central gas passage 144 to be vented through the vent valve 156 to the surrounding atmosphere or to a suitable collection chamber, tank, or the like.

In operation, pressurized gas from the cavity 54 may pass through the intake device 52 of FIG. 10 along a gas flow path (schematically illustrated in FIG. 10 as a gas flow path 158). Pressurized gas flows along the gas flow path 158 from the cavity 54, through the inlet aperture 108, through the gas passage 110, through the open end 112, through the first aperture 100, and into the central gas passage 144. Within the central gas passage 144, the pressurized gas is forced through the filter 140 and into the gas passage 120, thereby causing the filter 140 to remove and/or retain particulate matter entrained with the pressurized gas. The pressurized gas then flows along the gas flow path 158 through the gas passage 120, through the outlet 86, and is supplied to one or more downstream components such as the orifice pack 50 (see FIG. 1). During operation, particulate matter may accumulate on and/or within the filter 140 (e.g., on the inner surface 162 and/or within the central gas passage 144). The vent valve 156 may periodically be opened to vent pressurized gas from the central gas passage 144. The vented pressurized gas may carry particulate matter from the filter 140, thereby removing at least a portion of the particulate matter from the filter 140 and extending the operational life of the filter 140, for example, relative to an intake device which does not include the vent aperture 154 and vent valve 156.

In operation, pressurized gas from the cavity 54 may pass through the intake device 52 of FIG. 11 along a gas flow path (schematically illustrated in FIG. 11 as a gas flow path 164). Pressurized gas flows along the gas flow path 164 from the cavity 54, through the inlet aperture 108, through the gas passage 110, through the open end 112, through the inlet 150, and into the gas passage 120. Within the gas passage 120, the pressurized gas is forced through the filter 140 and into the central gas passage 144, thereby causing the filter 140 to remove and/or retain particulate matter entrained with the pressurized gas. The pressurized gas then flows along the gas flow path 164 through the central gas passage 144, through the first aperture 100, through the outlet 86, and is supplied to one or more downstream components such as the orifice pack 50 (see FIG. 1).

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A gas turbine engine comprising:
a compressor section disposed about an axial centerline of the gas turbine engine, the compressor section defining a portion of a core flow path through the gas turbine engine;
a cavity disposed downstream of the compressor section with respect to the core flow path;
an engine case disposed about the axial centerline, the engine case includes an interior side and an exterior side, the interior side surrounds the cavity, and the engine case includes a snorkel aperture which extends through the engine case from the exterior side to the interior side; and
an intake device positioned within the snorkel aperture, the intake device includes:
a snorkel including a tubular body and an inlet aperture, the tubular body extends between a closed end and an open end opposite the closed end, the inlet aperture is formed through the tubular body proximate the closed end, the tubular body forms a first portion of a gas flow path for a bleed gas from the inlet aperture to the open end, and the tubular body extends through the snorkel aperture with the inlet aperture positioned within the cavity; and
a filter case connected to the tubular body, the filter case extends between a first end and a second end, the filter case includes a sidewall extending from the first end to the second end, the sidewall surrounds a filter cavity, the filter case includes a first aperture and at least one second aperture, the first aperture extends from the filter cavity through the second end, the at least one second aperture extends through the sidewall, the filter case is configured to receive the bleed gas from the open end of the tubular body, and the filter case and the snorkel form a unitary component.

2. The gas turbine engine of claim 1, wherein the intake device further includes a housing, the housing is mounted to the engine case at the snorkel aperture, the housing includes a filter chamber and an outlet, the outlet extends through the housing from the filter chamber to an exterior of the housing, the filter case is positioned within the filter chamber.

3. The gas turbine engine of claim 2, wherein the intake device further includes a cap, the cap is positioned adjacent the first end, the cap is configured to sealingly engage the housing.

4. The gas turbine engine of claim 3, wherein the cap forms the unitary component with the filter case and the snorkel.

5. The gas turbine engine of claim 3, wherein the cap includes a first cap end, a second cap end, and a vent aperture, the second cap end is positioned adjacent the first end, and the vent aperture extends through the cap from the first cap end to the second cap end.

6. The gas turbine engine of claim 5, wherein the intake device further includes a vent valve fluidly coupled with the vent aperture.

7. The gas turbine engine of claim 2, wherein the intake device forms a second portion of the gas flow path downstream of the first portion of the gas flow path, and the intake device is configured so that the bleed gas flows along the second portion of the gas flow path from the snorkel into the filter cavity, from the filter cavity into a gas passage between the filter case and the housing, and from the gas passage through the outlet.

8. The gas turbine engine of claim 2, wherein the intake device forms a second portion of the gas flow path downstream of the first portion of the gas flow path, and the intake device is configured so that the bleed gas flows along the second portion of the gas flow path from the snorkel into a gas passage between the filter case and the housing, from the gas passage into the filter cavity, and from the filter cavity through the outlet.

9. The gas turbine engine of claim 1, further comprising a bleed-off valve in fluid communication with the intake device, the bleed-off valve configured to receive the bleed gas from the intake device.

10. The gas turbine engine of claim 9, wherein the bleed-off valve is in fluid communication with the core flow path within the compressor section via a pressure relief line.

11. The gas turbine engine of claim 1, wherein the inlet aperture faces a circumferential direction relative to the axial centerline.

12. The gas turbine engine of claim 11, wherein the compressor section is configured to impart a swirl component on pressurized gas flowing within the cavity, wherein the swirl component has a swirl direction about the axial centerline of the gas turbine engine, and wherein the inlet aperture is located facing away from the swirl direction.

13. An intake device for a gas turbine engine, the intake device comprising:
  a filter case extending between a first end and a second end, the filter case includes a sidewall extending from the first end to the second end, the sidewall surrounds a filter cavity between the first end and the second end, the filter case includes a first aperture and at least one second aperture, the first aperture extends from the filter cavity through the second end, the at least one second aperture extends through the sidewall;
  a snorkel including a tubular body and an inlet aperture, the tubular body extends between a closed end and an open end opposite the closed end, the inlet aperture is formed through the tubular body proximate the closed end, the tubular body is connected to the second end with the open end fluidly coupled with the first aperture;
  a cap connected to the second end, the cap includes a first cap end, a second cap end, and a vent aperture, the second cap end is positioned adjacent the first end, and the vent aperture extends through the cap from the first cap end to the second cap end.

14. The intake device of claim 13, wherein the filter case, the snorkel, and the cap form a unitary component.

15. The intake device of claim 13, further comprising a filter positioned within the filter cavity.

16. The intake device of claim 15, wherein the filter includes a tubular filter body, the tubular filter body includes a first filter end, a second filter end, an outer filter surface, an inner filter surface, and a central gas passage, the outer filter surface and the inner filter surface extend from the first filter end to the second filter end, the inner filter surface surrounds the central gas passage, and the vent aperture is in fluid communication with the central gas passage.

17. The intake device of claim 13, wherein the inlet aperture intersects the closed end.

18. The intake device of claim 13, wherein the inlet aperture is spaced from the closed end.

19. A gas turbine engine comprising:
  an engine case disposed about an axial centerline of the gas turbine engine, the engine case includes an interior side and an exterior side, the interior side surrounds an annular cavity, and the engine case includes a snorkel aperture which extends through the engine case from the exterior side to the interior side; and
  an intake device mounted to the engine case, the intake device includes:
    a housing, the housing is mounted to the engine case at the snorkel aperture, the housing includes a filter chamber and an outlet, the outlet extends through the housing from the filter chamber to an exterior of the housing;
    a snorkel including a tubular body and an inlet aperture, the tubular body extends between a closed end and an open end opposite the closed end, the inlet aperture is formed through the tubular body proximate the closed end, the inlet aperture is positioned within the annular cavity; and
    a filter case extending between a first end and a second end, the second end is mounted to the open end, the filter case includes a sidewall extending from the first end to the second end, the sidewall surrounds a filter cavity, the filter case includes a first aperture and at least one second aperture, the first aperture extends from the filter cavity through the second end, the at least one second aperture extends through the sidewall; and
    a cap positioned adjacent the first end, the cap is configured to sealingly engage the housing, at least the cap and the filter case forming a first unitary component.

20. The gas turbine engine of claim 19, wherein the housing and the snorkel form a second unitary component.

* * * * *